Patented July 3, 1951

2,559,331

UNITED STATES PATENT OFFICE 2,559,331

PROCESS FOR THE MANUFACTURE OF ESTERLIKE DERIVATIVES OF ORTHO: ORTHO'-DIHYDROXY-MONOAZO DYE-STUFFS

Willi Widmer, Bottmingen, and Alphonse Heckendorn, Basel, Switzerland, assignors to Ciba Limited, Basel, Switzerland, a Swiss firm No Drawing. Application March 16, 1948, Serial No. 15,274. In Switzerland April 11, 1947

5 Claims. (Cl. 260—162)

It is known from patent literature that in the manufacture of esters of ortho:ortho'-dihydroxy-azo-dyestuffs it is preferable to work in an organic solvent. It had therefore to be concluded that such reactions could only be carried out successfully in organic solvents, which seemed to be quite understandable on account of the low reactivity of hydroxyl groups in ortho-position to azo-linkages.

The present invention is based on the unexpected observation that ester-like derivatives can be made with advantage from ortho:ortho'-dihydroxy-monoazo-dyestuffs and organic acylating agents when the treatment with the organic acylating agent is conducted in an aqueous alkaline medium.

As ortho:ortho'-dyhydroxy-monoazo-dyestuffs there are to be understood monoazo-dyestuffs which contain the atomic grouping

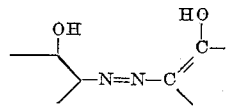

Especially suitable starting materials of this group are the dyestuffs which contain a single sulfonic acid group and at least once the radical of a component of the benzene or naphthalene series. Such monoazo-dyestuffs can be made in known manner, for example, by coupling the diazo-compound of an ortho-amino-hydroxybenzene or ortho-amino-hydroxynaphthalene with an azo-component capable of coupling in ortho-position with respect to a hydroxyl group, and so selecting the starting materials that one of the two components contains a sulfonic acid group. The ortho-amino-hydroxybenzene or ortho-amino-hydroxynaphthalene to be converted into the diazo-compound may contain further substituents such, for example, as the sulfonic acid group just mentioned or other substituents. As such substituents there may be mentioned, for example, halogen atoms, such as bromine and especially chlorine atoms, nitro groups, alkoxy groups, sulfonic acid alkyl-aryl-amide groups or alkyl groups. As examples of ortho-amino-hydroxy-compounds to be converted into diazo-compounds, there may be mentioned, inter alia: Those which contain a sulfonic acid and are to be coupled with azo-components free from sulfonic acid groups: 2 - amino - 1 - hydroxybenzene - 4 - sulfonic acid, 4 - methyl - 2 - amino - 1 - hydroxy - benzene - 5 - sulfonic acid, 4 - chloro - 2 - amino - 1 - hydroxybenzene - 6 - sulfonic acid, 4 - nitro - 2 - amino - 1 - hydroxybenzene - 6 - sulfonic acid, 6 - nitro - 2 - amino - 1 - hydroxybenzene - 4 - sulfonic acid, 5 - nitro - 2 - amino - 1 - hydroxybenzene - 4 - sulfonic acid, 1 - amino - 2 - hydroxynaphthalene - 4 - sulfonic acid, 2 - amino - 1 - hydroxy - naphthalene - 4 - sulfonic acid, 6 - nitro - 1 - amino - 2 - hydroxynaphthalene - 4 - sulfonic acid; and those which are free from sulfonic acid groups and are to be coupled with azo-components containing a sulfonic acid group: 2 - amnio - 1 - hydroxybenzene, 4 - chloro - 2 - amino - 1 - hydroxybenzene, 4:6 - dichloro - 2 - amino - 1 - hydroxybenzene, 3:4:6 - trichloro - 2 - amino - 1 - hydroxybenzene, 6 - nitro - 4 - methyl - 2 - amino - 1 - hydroxybenzene, 4 - nitro - 2 - amino - 1 - hydroxybenzene, 5 - nitro - 2 - amino - 1 - hydroxybenzene, 6 - nitro - 2 - amino - 1 - hydroxybenzene, 5 - nitro - 4 - chloro - 2 - amino - 1 - hydroxybenzene, 6 - nitro - 4 - chloro - 2 - amino - hydroxybzenzene, 4 - nitro - 6 - chloro - 2 - amino - 1 - hydroxybenzene, 4:6 - dinitro - 2 - amino - 1 - hydroxybenzene or 2 - amino - 1 - hydroxybenzene - 4 - sulfonic acid diethylamide.

As azo-components which come into consideration for making the ortho:ortho'-dyhydroxy-monoazo-dyestuffs containing a single sulfonic acid group and serving as starting materials in the present process, there are suitable those which owe their capacity for coupling either to a phenolic hydroxyl group or to a reactive methylene group. As examples of such azo-components there may be mentioned, hydroxybenzenes coupling in ortho-position to a hydroxyl group, such as 1 - hydroxy - 4 - methylbenzene, 1 - hydroxy - 4 - tertiary - amylbenzene, 1 - hydroxy - 4 - isobutylbenzene; 8 - hydroxyquinolines coupling in ortho-position to the hydroxyl group, such as 5-chloro-8-hydroxyquinoline; acetoacetic acid arylides such as acetoacetic acid anilide or acetoacetic acid ortho-anisidide; and also 2:4-dihydroxyquinoline, and others. Especially good results can be produced with hydroxy-naphthalenes coupling or capable of coupling in ortho-position to a hydroxyl group, or with pyrazolones especially 1 - aryl - (for example, phenyl) - 3 - methyl - 5 - pyrazolones. As examples of such azo-components there may be mentioned: 1-hydroxy-naphthalene (which must be used in such manner that coupling occurs in the 2-position, for example, in a medium rendered strongly alkaline with caustic alkali), 5 - chloro - 1 - hydroxy-naphthalene, 5:8 - dichloro - 1 - hydroxynaphthalene, 1 - hydroxy - 4 - methylnaphthalene, 1 - hydroxy - 4 - methoxynaphthalene, 2 - hydroxy-naphthalene, 2 - hydroxy - 6 - methoxynaphthalene, 2 - hydroxy - 7 - methoxynaphthalene, 2 - hydroxynaphthalene - 6 - sulfonic acid diethylamide, 1 - hydroxynaphthalene - 4 - sulfonic acid, 1 - hydroxy - naphthalene - 5 - sulfonic acid, 2 - hydroxynaphthalene - 4 - sulfonic acid, 2 - hydroxynaphthalene - 6 - sulfonic acid, 2 - hydroxynaphthalene - 7 - sulfonic acid, 1 - hydroxynaphthalene - 3 - sulfonic acid - N - methylanilide - 8 - sulfonic acid; 3 - methyl - 5 - pyrazolone, 1:3 - diphenyl - 5 - pyrazolone, 1 - phenyl - 3 - methyl - 5 - pyrazolone, 1 - (3' - nitro) - phenyl - 3 - methyl - 5 - pyrazolone, 1 - (2' - chlor) - phenyl - 3 - methyl - 5 - pyrazolone, 1 - (3' - sulfo) - phenyl - 3 - methyl - 5 - pyrazolone, 1 - (2' - chlor - 5' - sulfo) - phenyl - 3 - methyl - 5 - pyrazolone and 1 - (2' - methyl - 5' - sulfo) - phenyl - 3 - methyl - 5 - pyrazolone.

As acylating agents for the treatment of the ortho:ortho'-dihydroxy-monoazo-dyestuffs containing a sulfonic acid group in accordance with the invention there may be mentioned, among others: maleic anhydride and terephthalic anhydride. However, there are suitable above all acylating agents which contain as the group bringing about the acylation a single functionally converted carboxyl group, for example, a carboxylic acid halide such as the bromide or chloride or a carboxylic anhydride. Especially good results can be obtained with compounds of this kind which are otherwise free from groups imparting solubility and groups convertible into such groups, for example, cinnamic acid chloride, arylhydroxyacetic acid halides, acetic anhydride, butyric acid chloride and the like, and especially derivatives of benzoic acid such as meta- or para-nitrobenzoyl chloride, p-chloro-benzoyl chloride and principally benzoic acid halides such as benzoyl bromide and especially benzoyl chloride.

The treatment of the ortho:ortho'-dihydroxy-monoazo-dyestuffs is carried out in an aqueous alkaline medium. It is generally desirable to use the acylating agent in excess of the theoretical quantity. The acylation may, for example, be carried out at room temperature, for example, at about 20° C. The acylation may be so conducted, for example, by suitably choosing the nature and quantity of the acylating agent, that only one or both of the hydroxyl groups in ortho-position to the azo-linkage is or are esterified, depending on the object in view, for example, on the solubility of the ester-like derivative to be obtained. In the case of dyestuffs made from a 1 - phenyl - 3 - methyl - 5 - pyrazolone as coupling component, for example, the enolised keto group in the 5-position of the pyrazolone radical is generally not esterified in the present process. To avoid saponification it is advisable to work up the resultant ester-like derivatives from a neutral to slightly acid medium.

A process for the production of chromable dyestuffs by treating ortho:ortho'-dihydroxy-monoazo-dyestuffs, which contain a single sulfonic acid group, with an organic acylating agent has been disclosed in U. S. patent application Ser. No. 729,417, filed February 18, 1947. However, these dyestuffs are always prepared in an anhydrous medium in the presence of a tertiary organic base. As compared with this known process, the present invention leads to practically the same products and has the advantage of working in an aqueous medium. In practice, this means (a) a great simplification with respect to the apparatus required, (b) that there is no solvent to be recovered and, consequently, no loss of any part thereof, and no equipment for such purpose is needed, and (c) that there is no need to dry the starting dyestuffs before treating them with acylating agents.

The ester-like derivatives of ortho:ortho'-dihydroxy-azo-dyestuffs obtainable by the present invention are especially suitable for dyeing by the chroming process in which dyeing is carried out in a single bath with a solution containing both the dyestuff and an agent yielding chromium. A dyeing process of this kind is, for example, that in which dyeing solutions are used which contain the dyestuff, an alkali chromate, for example, sodium chromate or potassium chromate, and a buffer salt which prevents the solution becoming alkaline at a raised temperature, for example, at 100° C. Such a salt is, for example, ammonium sulfate. The process of dyeing by the single bath chroming process with a solution which contains the dyestuff, an alkali chromate and ammonium sulfate is known as the synchromate process or the metachrome process. An object of the present invention is to convert chromable dyestuffs, and more especially those which are not suitable for dyeing by the aforesaid single bath chroming process, in a simple and advantageous manner into dyestuffs which are well suited for that dyeing process. In this dyeing process the complex chromium compound of the dyestuff is formed with splitting off of the acyl radical. The resulting dyestuffs may be distinguished by very good fastness properties, especially by very good properties of wet fastness. As fibers which can be dyed by the single bath chroming process, especially the so-called synchromate process, with the monoazo-dyestuffs obtainable by the present invention there may be mentioned above all fibers of animal origin such as silk, leather, and principally wool. However, it is also possible to dye in this manner mixed fabrics, for example, of wool and regenerated cellulose, and furthermore animalised cellulose, artificial fibers of casein, artificial fibers of superpolyamides or superpolyurethanes.

Under the aforementioned single bath chroming process, the dyestuffs obtainable by the present process in many cases yield particularly useful, even dyeings when they are used in the presence of dyeing and dispersing agents. For this purpose, wetting and dispersing agents of the ionogenic type may be used but those of the non-ionogenic type are to be preferred. Examples of the latter kind are: Polyglycolic ethers of higher molecular fatty alcohols, preferably those with a content of at least 10, e. g. 20–25 ethylene oxide radicals in their molecule and those whose fatty alcohol radicals contain 16–18 carbon atoms. Products of this kind are described, for example, in French Patent No. 727,202.

The following examples illustrate the invention the parts and percentages being by weight:

*Example 1*

18.6 parts of 1-phenyl-3-methyl-5-pyrazolone are dissolved in 60 parts of water with the addition of 4.5 parts of sodium hydroxide. There is then added to this solution at room temperature the diazo compound obtained from 23.9 parts of 1 - amino - 2 - hydroxy - naphthalene - 4 - sulfonic acid which has precipitated in the form of the sodium salt and then separated by filtration. When the coupling is complete, 150 parts of water, 12.5 parts of crystallized sodium acetate and 4.2 parts of sodium hydroxide are added and the dyestuff esterified by the addition of 25 parts of benzoyl chloride. While these additions are made the temperature rises about 15–20° C. and the yellow-orange dyestuff ester of the formula

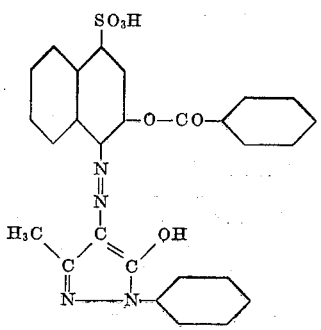

precipitates. It is separated by filtration, washed with water or dilute sodium chloride solution and dried. An orange-colored powder is obtained which dissolves in hot water with an orange coloration and dyes wool under the single bath process in the presence of an agent yielding chromium bluish red tints.

Products with similar properties are obtained when the esterification is effected, not with benzoyl chloride, but with the equivalent quantity of para-chloro-benzoyl chloride or isobutyric acid chloride.

*Example 2*

22.3 parts of the dyestuff (monosodium salt) from diazotized 1-amino-2-hydroxynaphthalene-4-sulfonic acid and 1-phenyl-3-methyl-5-pyrazolone are stirred in the form of a moist paste with 30 parts of an aqueous sodium carbonate solution of 18 per cent. strength and esterified by adding dropwise at 20–30° C. 11 parts of benzoyl chloride. The yellow-orange esterification product gradually precipitates. After being diluted with 100 parts of water, it is filtered, washed with some water and sodium chloride solution of 2 per cent. strength and dried. About 25 parts of an orange powder are obtained which has the same properties as the product obtained according to Example 1.

*Example 3*

24.5 parts of the dyestuff, which has been obtained by coupling diazotized 1-amino-2-hydroxy-6-nitro-naphthalene-4-sulfonic acid with 1-phenyl-3-methyl-5-pyrazolone, are stirred with 40 parts of water and 7 parts of sodium hydroxide solution of 30 per cent. strength, and esterified by introducing dropwise at 20–30° C. 9 parts of benzoyl chloride. Stirring is continued for another 2–3 hours before the yellow-brown dyestuff ester of the formula

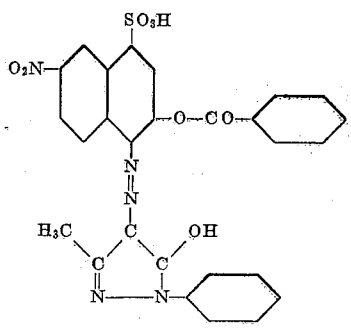

is filtered off, washed with water, and dried under reduced pressure. There is obtained a yellow-brown powder which dissolves clearly in boiling water with an orange coloration and which dyes wool by the single bath process in the presence of an agent yielding chromium a powerful red tint.

*Example 4*

41.6 parts of the ortho:ortho'-dihydroxy-monoazo dyestuff (monosodium salt) from diazotized 1-amino-2-hydroxynaphthalene-4-sulfonic acid and 1-hydroxynaphthalene in the form of a moist paste are stirred with 110 parts of water and 15 parts of crystallized sodium acetate and 4.05 parts of sodium hydroxide added to the solution. The dyestuff is esterified at 20–30° C. by the addition of 15 parts of benzoyl chloride. Stirring is continued for a few hours and the red-brown dyestuff ester of the formula

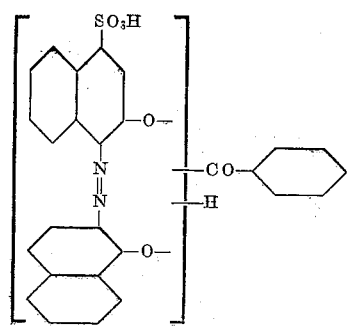

then separated by filtration, washed with dilute sodium chloride solution, and dried. A dark red powder is obtained which dissolves in hot water with a dark red coloration and dyes wool by the single bath process in the presence of an agent yielding chromium blue tints.

*Example 5*

41.6 parts of the dyestuff (monosodium salt) from diazotized 1-amino-2-hydroxynaphthalene-4-sulfonic acid and 2-hydroxynaphthalene in the form of a moist paste are stirred with 100 parts of water, 15 parts of crystallized sodium acetate and 4.05 parts of sodium hydroxide and esterified at 20–30° C. by running in 15 parts of benzoyl chloride, the initially alkaline reaction of the mass changing to distinctly acid to litmus. Stirring is continued for about one hour, followed by dilution with 100 parts of water, separation of the dyestuff by filtering, washing it with dilute sodium chloride solution and drying. A red-brown powder is obtained which dissolves in hot water with a red coloration and dyes wool by the single bath process in the presence of an agent yielding chromium pure navy blue tints. The so obtained dyestuff ester corresponds to the formula

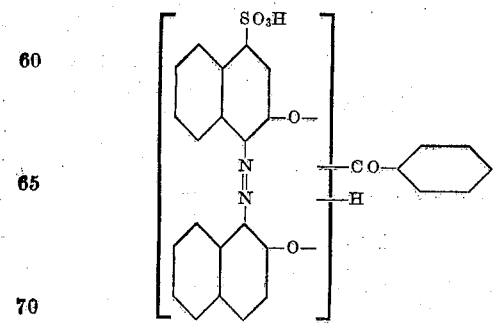

A similar product is obtained if, instead of benzoyl chloride, an equivalent quantity of para-chlorobenzoyl-chloride is used to effect esterification in the indicated manner.

Example 6

43 parts of the dyestuff (monosodium salt) from diazotized 1-amino-2-hydroxynaphthalene-4-sulfonic acid and 4-methyl-1-hydroxynaphthalene in the form of a moist paste are stirred with 100 parts of water, 20 parts of crystallized sodium acetate and 4.05 parts of sodium hydroxide and esterified at 20–30° C. with 16 parts of benzoyl chloride. Stirring is continued for a few more hours and the brown dyestuff ester of the formula

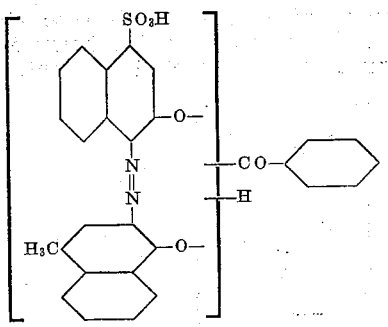

then separated by filtration, washed with dilute sodium chloride solution and dried. A red-brown powder is obtained which dissolves in hot water with a red coloration and dyes wool by the single bath process in the presence of an agent yielding chromium blue tints.

Example 7

39.6 parts of the dyestuff (monosodium salt) from diazotized 1-hydroxy-2-aminobenzene-4-sulfonic acid and 1 - phenyl - 3 - methyl - 5 - pyrazolone are dissolved in 300 parts of water with the addition of 6 parts of sodium hydroxide. After the addition of 20 parts of crystallized sodium acetate there follows esterification with 20 parts of benzoyl chloride, whereupon the yellow-orange dyestuff ester of the formula

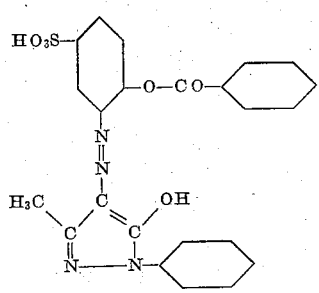

precipitates within a short time while the reaction mass becomes acid to litmus. Stirring is continued for 1 hour, before the dyestuff ester is separated by filtration, washed, and dried. A yellow-orange powder is obtained which dissolves in hot water with a yellow coloration and dyes wool by the single bath process in the presence of an agent yielding chromium orange tints.

Example 8

43.5 parts of the dyestuff (monosodium salt) from diazotized 2-amino-1-hydroxybenzene-4-sulfonic acid and 5:8-dichloro-1-hydroxynaphthalene in the form of a moist paste are stirred with 400 parts of water, 8.1 parts of sodium hydroxide and 30 parts of crystallized sodium acetate, and esterified at 15–25° C. with 30 parts of benzoyl chloride. The red dyestuff ester of the formula

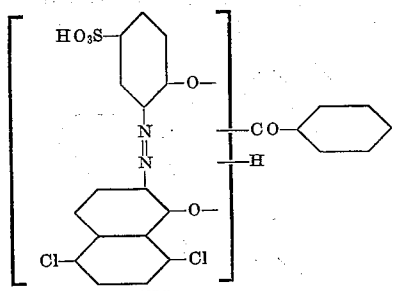

precipitates and is separated by filtration after stirring for another hour, then washed with dilute sodium chloride solution, and dried. A red powder is obtained which dissolves in hot water with a red coloration and dyes wool by the single bath process in the presence of an agent yielding chromium reddish blue tints.

Example 9

100 parts of well wetted wool are entered at 60° C. into a dyebath containing in 4000 parts of water, 2 parts of the dyestuff obtainable as described in Example 1, 1.5 parts of ammonium sulfate, 1.5 parts of sodium chromate and 20 parts of crystallized sodium sulfate. The temperature is raised to the boil in the course of 30 minutes, and the whole is boiled for 45 minutes. 0.5 part of acetic acid of 40 per cent. strength is then added and boiling is continued for a further 45 minutes. The wool is dyed a fast bluish red tint.

Example 10

A dye bath is made up from 4000 parts of water, 2 parts of the dyestuff obtaintable according to Example 5, 1.5 parts of ammonium sulfate, 1.5 parts of sodium chromate, 20 parts of crystallized sodium sulfate and 1 part of a polyglycolic ether of a fatty alcohol whose fatty alcohol radical contains 16–18 carbon atoms and whose polyglycol radical contains the radicals of 20–25 molecules of ethylene oxide. Into this dyebath there are entered at 60° C. 100 parts of well wetted wool, the temperature is raised to the boil in the course of 30 minutes and the whole is boiled for 45 minutes. 0.5 part of acetic acid of 40 per cent. strength is then added and boiling continued for another 45 minutes. The wool is evenly dyed a navy blue tint.

What we claim is:

1. Process for the manufacture of an ester of an ortho:ortho'-dihydroxy-monoazo-dyestuff which comprises reacting in an aqueous alkaline medium an ortho:ortho'-dihydroxy-monoazo-dyestuff containing a single sulfonic acid group with an acylating agent selected from the group consisting of monocarboxylic acid halides and monocarboxylic acid anhydrides, which acylating agent is otherwise free from groups imparting solubility and substituents convertible into such groups.

2. Process for the manufacture of an ester of an ortho:ortho'-dihydroxy-monoazo-dyestuff which comprises reacting in an aqueous alkaline medium an ortho:ortho'-dihydroxy-monoazo-dyestuff containing a single sulfonic acid group with benzoyl chloride.

3. Process for the manufacture of an ester of an ortho:ortho'-dihydroxy-monoazo-dyestuff which comprises reacting in an aqueous alkaline medium the dyestuff which corresponds in its free acid state to the formula

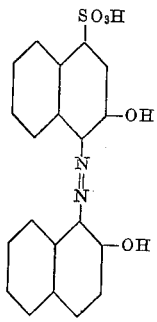

with benzoyl chloride.

4. Process for the manufacture of an ester of an ortho:ortho'-dihydroxy-monoazo-dyestuff which comprises reacting in an aqueous alkaline medium the dyestuff which corresponds in its free acid state to the formula

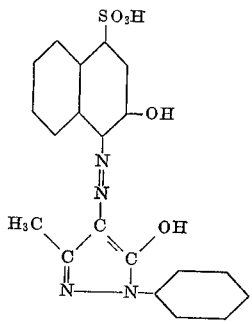

with benzoyl chloride.

5. Process for the manufacture of an ester of an ortho:ortho'-dihydroxy-monoazo-dyestuff which comprises reacting in an aqueous alkaline medium the dyestuff which corresponds in its free acid state to the formula

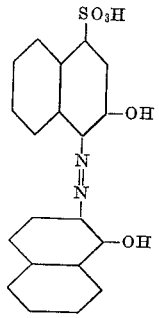

with benzoyl chloride.

WILLI WIDMER.
ALPHONSE HECKENDORN.

REFERENCES CITED

The following references are of record in the file of this patent:

UNITED STATES PATENTS

| Number | Name | Date |
|---|---|---|
| 808,919 | Hagenbach | Jan. 2, 1906 |
| 1,067,881 | Richard | July 22, 1913 |
| 1,667,333 | Straub et al. | Apr. 24, 1928 |
| 1,946,951 | Straub | Feb. 13, 1934 |
| 2,120,741 | Graenacher et al. | June 14, 1938 |
| 2,170,262 | Graenacher et al. | Aug. 22, 1939 |
| 2,478,185 | Felix et al. | Aug. 9, 1949 |

Certificate of Correction

Patent No. 2,559,331 July 3, 1951

WILLI WIDMER ET AL.

It is hereby certified that error appears in the printed specification of the above numbered patent requiring correction as follows:

Column 1, line 17, for "dyhydroxy" read *dihydroxy*; column 2, line 10, for "amnio" read *amino*; line 25, for "dyhydroxy" read *dihydroxy*; column 5, lines 67 to 69 inclusive, Example 3, for that portion of the formula reading $$\begin{matrix} & C & \\ C & & C \end{matrix} \quad \text{read} \quad \begin{matrix} & C & \\ C & & C \end{matrix}$$

column 8, line 41, for "obtaintable" read *obtainable*;

and that the said Letters Patent should be read as corrected above, so that the same may conform to the record of the case in the Patent Office.

Signed and sealed this 25th day of September, A. D. 1951.

[SEAL]

THOMAS F. MURPHY,
*Assistant Commissioner of Patents.*